(12) United States Patent
Kim et al.

(10) Patent No.: US 11,448,934 B2
(45) Date of Patent: Sep. 20, 2022

(54) OPTICAL DEVICE

(71) Applicant: LG Chem, Ltd., Seoul (KR)

(72) Inventors: Nam Hun Kim, Daejeon (KR); Seong Min Lee, Daejeon (KR); Byoung Kun Jeon, Daejeon (KR); Su Young Ryu, Daejeon (KR); Jung Woon Kim, Daejeon (KR); Young Shin Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/980,685

(22) PCT Filed: Mar. 27, 2019

(86) PCT No.: PCT/KR2019/003546
§ 371 (c)(1),
(2) Date: Sep. 14, 2020

(87) PCT Pub. No.: WO2019/190187
PCT Pub. Date: Oct. 3, 2019

(65) Prior Publication Data
US 2021/0018772 A1    Jan. 21, 2021

(30) Foreign Application Priority Data

Mar. 27, 2018    (KR) .................. 10-2018-0035245

(51) Int. Cl.
*G02F 1/137*     (2006.01)
*G02F 1/1335*    (2006.01)
*G02F 1/1333*    (2006.01)

(52) U.S. Cl.
CPC ........ *G02F 1/137* (2013.01); *G02F 1/133528* (2013.01); *G02F 1/133302* (2021.01);
(Continued)

(58) Field of Classification Search
CPC .......... G02F 2202/28; G02F 1/133305; G02F 2001/133305; G02F 2001/133368;
(Continued)

(56) References Cited

U.S. PATENT DOCUMENTS

| | | | | |
|---|---|---|---|---|
| 8,576,370 B1 * | 11/2013 | Sampica | ............... | G02F 1/1335 349/155 |
| 2004/0090568 A1 * | 5/2004 | Iijima | ............... | G02F 1/133528 349/65 |
| 2009/0185127 A1 * | 7/2009 | Tanaka | ................ | G02F 1/13454 349/152 |

(Continued)

FOREIGN PATENT DOCUMENTS

| | | |
|---|---|---|
| EP | 3617770 A1 | 3/2020 |
| JP | S63163816 A | 7/1988 |

(Continued)

OTHER PUBLICATIONS

International Search Report for PCT/KR2019/003546 dated Jul. 4, 2019; 2 pages.

(Continued)

*Primary Examiner* — Mariam Qureshi
(74) *Attorney, Agent, or Firm* — Lerner, David, Littenberg, Krumholz & Mentlik, LLP

(57) ABSTRACT

An optical device is provided in the present application. The present application provides an optical device capable of varying transmittance, and such optical device can be used for various applications, such as eyewear, for example, sunglasses or AR (augmented reality) or VR (virtual reality) eyewear, an outer wall of a building or a sunroof for a vehicle.

14 Claims, 13 Drawing Sheets

(52) U.S. Cl.
CPC .... *G02F 1/133565* (2021.01); *G02F 2201/56* (2013.01); *G02F 2202/28* (2013.01)

(58) Field of Classification Search
CPC .......... G02F 2201/56; G02F 1/133528; G02F 1/133368; G06F 1/1652; G09G 2380/02; F21S 41/645; F21S 41/153; F21S 41/255; F21S 41/143
See application file for complete search history.

(56) References Cited

U.S. PATENT DOCUMENTS

| | | | | |
|---|---|---|---|---|
| 2009/0290117 | A1* | 11/2009 | Watanabe | G02F 1/1339 349/153 |
| 2012/0020056 | A1* | 1/2012 | Yamagata | G02F 1/133308 362/97.1 |
| 2015/0168792 | A1* | 6/2015 | Woo | H04N 5/64 349/110 |
| 2016/0041425 | A1* | 2/2016 | Oh | G02B 5/3083 349/12 |
| 2016/0091743 | A1 | 3/2016 | Yu et al. | |
| 2018/0101041 | A1* | 4/2018 | Kim | G02F 1/13394 |
| 2020/0333660 | A1 | 10/2020 | Park et al. | |

FOREIGN PATENT DOCUMENTS

| | | |
|---|---|---|
| JP | H06018856 A | 1/1994 |
| JP | 2004046121 A | 2/2004 |
| JP | 2014219508 A | 11/2014 |
| JP | 2017181888 A | 10/2017 |
| KR | 20030065638 A | 8/2003 |
| KR | 20140015081 A | 2/2014 |
| KR | 20160006873 A | 1/2016 |
| KR | 20160038964 A | 4/2016 |
| KR | 101705422 B1 | 2/2017 |
| KR | 20170040848 A | 4/2017 |
| WO | 2008013013 A1 | 1/2008 |
| WO | 2010125976 A1 | 11/2010 |
| WO | 2012177995 A1 | 12/2012 |
| WO | 2017135182 A1 | 8/2017 |
| WO | 2018199618 A1 | 11/2018 |

OTHER PUBLICATIONS

Extended Suropean Search Report for Application No. 19774535.9, dated Mar. 29, 2021, 11 pages.

* cited by examiner

Fig. 5

| 110 |
|---|
| 120 |
| 201 |
| 110 |

OPTICAL DEVICE

CROSS-REFERENCE TO RELATED APPLICATION

The present application is a national phase entry under 35 U.S.C. § 371 of International Application No. PCT/KR2019/003546 filed Mar. 27, 2019, which claims priority from Korean Patent Application No. 10-2018-0035245 filed on Mar. 27, 2018, the disclosure of which are incorporated herein by reference in their entirety.

TECHNICAL FIELD

The present application relates to an optical device.

BACKGROUND ART

Various optical devices are known, which are designed so that transmittance can be varied using liquid crystal compounds. For example, transmittance-variable devices using a so-called GH cell (guest host cell), to which a mixture of a host material and a dichroic dye guest is applied, are known, and in the device, a liquid crystal compound is mainly used as the host material. Such transmittance-variable devices may be applied to various applications including eyewear such as sunglasses and eyeglasses, outward walls of a building or sunroofs of a vehicle, and the like.

DISCLOSURE

Technical Problem

The present application provides an optical device.

Technical Solution

The present application is an optical device capable of adjusting transmittance, which relates to, for example, an optical device capable of switching at least between a transparent mode and a black mode.

The transparent mode is a state where the optical device exhibits relatively high transmittance, and the black mode is a state where the optical device has relatively low transmittance.

In one example, the optical device may have transmittance in the transparent mode of about 30% or more, about 35% or more, about 40% or more, about 45% or more, or about 50% or more. Also, the optical device may have transmittance in the black mode of about 20% or less, about 15% or less, or about 10% or less.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 95%, about 90%, about 85%, about 80%, about 75%, about 70%, about 65% or about 60%. The lower limit of the transmittance in the black mode may be about 0%, about 1%, about 2%, about 3%, about 4%, about 5%, about 6%, about 7%, about 8%, about 9%, or about 10%.

The transmittance may be linear light transmittance. The term linear light transmittance may be a ratio of, relative to light which is incident on the optical device in a predetermined direction, light (linear light) transmitted through the optical device in the same direction as the incident direction.

In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. The optical device may also be designed to be capable of implementing, for example, a third mode which may represent any transmittance between the transmittance of the transparent mode and the transmittance of the black mode.

The switching between such modes can be achieved, as the optical device comprises an active liquid crystal element. Here, the active liquid crystal element is an element comprising at least a liquid crystal compound, which is a liquid crystal element capable of switching between at least two or more oriented states (for example, first and second oriented states) of light axes in the liquid crystal compound. Here, the optical axis may mean the long axis direction when the liquid crystal compound included in the liquid crystal element is a rod type, and may mean the normal direction of the disc plane when it is a discotic type. For example, in the case where the liquid crystal element comprises a plurality of liquid crystal compounds whose directions of the optical axes are different from each other in any oriented state, the optical axis of the liquid crystal element may be defined as an average optical axis, and in this case, the average optical axis may mean the vector sum of the optical axes of the liquid crystal compounds.

The oriented state in such a liquid crystal element can be changed by applying energy, for example, by applying a voltage. For example, the liquid crystal element may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first state.

The liquid crystal element may comprise a liquid crystal layer containing at least a liquid crystal compound. In one example, the liquid crystal layer may be a so-called guest host liquid crystal layer. In this case, the liquid crystal layer of the liquid crystal element may comprise a liquid crystal compound and an anisotropic dye. Such a liquid crystal layer is a liquid crystal layer using a so-called guest host effect, which is a liquid crystal layer in which the anisotropic dyes are aligned according to an alignment direction of the liquid crystal compound (hereinafter, may be referred to as a liquid crystal host). The alignment direction of the liquid crystal host may be adjusted depending on whether or not external energy is applied.

The kind of the liquid crystal compound or the liquid crystal host contained in the liquid crystal layer is not particularly limited and a general liquid crystal compound known in this field can be used.

For example, as the liquid crystal compound or the liquid crystal host, a smectic liquid crystal compound, a nematic liquid crystal compound or a cholesteric liquid crystal compound, and the like can be used. In general, a nematic liquid crystal compound can be used. The term nematic liquid crystal compound means a liquid crystal compound that liquid crystal molecules have no regularity with respect to positions but all can be arranged in order along the molecular axis direction. Such a liquid crystal compound may be in a rod form or may be in a discotic form.

As such a nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3, more than 4, more than 5, more than 6, or more than 7, or may be less than −2 or less than −3. The liquid crystal compound may also have optical anisotropy ($\Delta n$) of about 0.01 or more, about 0.02 or more, about 0.03 or more, or about 0.04 or more. In another example, the optical anisotropy of the liquid crystal compound may be about 0.3 or less, or about 0.27 or less.

Liquid crystal compounds that can be used for implementation of black and transparent modes, or other liquid crystal compounds that can be used as liquid crystal hosts for guest host liquid crystal layers, are well known to those skilled in the art, and the liquid crystal compound can be selected freely from them.

The liquid crystal layer may comprise an anisotropic dye together with the liquid crystal host. The term "dye" may mean a material capable of intensively absorbing and/or modifying light in at least a part or the entire range in a visible light region, for example, a wavelength range of 380 nm to 780 nm, and the term "anisotropic dye" may mean a material capable of anisotropically absorbing light in at least a part or the entire range of the visible light region.

As the anisotropic dye, for example, known dyes known to have properties that can be aligned according to the aligned state of the liquid crystal host may be selected and used. For example, azo dyes or anthraquinone dyes and the like may be used as the anisotropic dyes, and the liquid crystal layer may also comprise one or two or more dyes in order to achieve light absorption in a wide wavelength range.

A dichroic ratio of the anisotropic dye can be appropriately selected. For example, the anisotropic dye may have a dichroic ratio of 5 or more to 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The anisotropic dye may have the dichroic ratio in at least a part of wavelengths or any one wavelength or the entire range in the wavelength range of the visible light region, for example, in the wavelength range of about 380 nm to 780 nm or about 400 nm to 700 nm.

The content of the anisotropic dye in the liquid crystal layer may be appropriately selected in consideration of the object. For example, the content of the anisotropic dye may be selected in a range of 0.1 to 10% by weight based on the total weight of the liquid crystal host and the anisotropic dye. The ratio of the anisotropic dye may be changed in consideration of the desired transmittance and the solubility of the anisotropic dye in the liquid crystal host, and the like.

The liquid crystal layer basically comprises the liquid crystal host and the anisotropic dye, and may further comprise other optional additives according to a known form, if necessary. As an example of the additive, a chiral dopant or a stabilizer can be exemplified, without being limited thereto.

The liquid crystal layer may have an anisotropy degree (R) of about 0.5 or more. The anisotropy degree (R) is determined from absorbance (E(p)) of a light beam polarized parallel to the alignment direction of the liquid crystal host and absorbance (E(s)) of a light beam polarized perpendicularly to the alignment direction of the liquid crystal host according to the following equation.

$$\text{Anisotropy degree}(R)=[E(p)-E(s)]/[E(p)+2*E(s)]$$ <Anisotropy Degree Equation>

The above-used reference is another identical apparatus that does not contain a dye in the liquid crystal layer.

Specifically, the anisotropy degree (R) may be determined from the value (E(p)) for the absorbance of the liquid crystal layer in which the dye molecules are horizontally oriented and the value (E(s)) for the absorbance of the same liquid crystal layer in which the dye molecules are vertically oriented. The absorbance is measured in comparison with a liquid crystal layer which does not contain any dye at all but has the same constitution. This measurement may be performed, in the case of one vibration plane, using a polarized beam vibrating in a direction parallel to the alignment direction (E(p)) and vibrating in a direction perpendicular to the alignment direction (E(s)) in subsequent measurements. The liquid crystal layer is not switched or rotated during the measurement, and thus the measurement of E(p) and E(s) may be performed by rotating the vibration plane of the polarized incident light.

One example of a detailed procedure is as described below. The spectra for the measurement of E(p) and E(s) can be recorded using a spectrometer such as a Perkin Elmer Lambda 1050 UV spectrometer. The spectrometer is equipped with Glan-Thompson polarizers for a wavelength range of 250 nm to 2500 nm in both of the measuring beam and the reference beam. The two polarizers are controlled by a stepping motor and are oriented in the same direction. The change in the polarizer direction of the polarizer, for example, the conversion of 0 degrees to 90 degrees, is always performed synchronously and in the same direction with respect to the measuring beam and the reference beam. The orientation of the individual polarizers may be measured using the method described in T. Karstens' 1973 thesis in the University of Wurzburg.

In this method, the polarizer is rotated stepwise by 5 degrees with respect to the oriented dichroic sample, and the absorbance is recorded, for example, at a fixed wavelength in the maximum absorption region. A new zero line is executed for each polarizer position. For the measurement of two dichroic spectra E(p) and E(s), anti-parallel-rubbed test cells coated with polyimide AL-1054 from JSR are located in both the measuring beam and the reference beam. Two test cells can be selected with the same layer thickness. The test cell containing a pure host (liquid crystal compound) is placed in the reference beam. The test cell containing a solution of a dye in the liquid crystals is placed in the measuring beam. Two test cells for the measuring beam and the reference beam are installed in a ray path in the same alignment direction. In order to ensure the maximum possible accuracy of the spectrometer, E(p) may be in its maximum absorption wavelength range, for example, a wavelength range of 0.5 to 1.5. This corresponds to transmittance of 30% to 5%. This is set by correspondingly adjusting the layer thickness and/or the dye concentration.

The anisotropy degree (R) can be calculated from the measured values of E(p) and E(s) according to the above equation as shown in a reference [see: "Polarized Light in Optics and Spectroscopy," D. S. Kliger et al., Academic Press, 1990].

In another example, the anisotropy degree (R) may be about 0.55 or more, 0.6 or more, or 0.65 or more. The anisotropy degree (R) may be, for example, about 0.9 or less, about 0.85 or less, about 0.8 or less, about 0.75 or less, or about 0.7 or less.

Such an anisotropy degree (R) can be achieved by controlling the kind of the liquid crystal layer, for example, the kind of the liquid crystal compound (host), the kind and the ratio of the anisotropic dye, or the thickness of the liquid crystal layer, and the like.

It is possible to provide an optical device with high contrast ratio by increasing the difference in the transmittance between the transparent state and the black state while using lower energy through the anisotropy degree (R) in the above range.

The thickness of the liquid crystal layer may be appropriately selected in consideration of the object, for example, the desired anisotropy degree or the like. In one example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. By controlling the thickness in this manner, it is possible to realize an optical device having a large difference in transmittance between the transparent state and the black state, that is, a device having a large contrast ratio. The thicker the thickness is, the higher the contrast ratio can be realized, and thus it is not particularly limited, but it may be generally about 30 μm or less, 25 μm or less, 20 μm or less, or 15 μm or less.

Such an active liquid crystal layer or the liquid crystal element comprising the same may switch between a first oriented state and a second oriented state different from the first oriented state. The switching may be controlled, for example, through application of external energy such as a voltage. For example, any one of the first and second oriented states may be maintained in a state where the voltage is not applied, and then switched to the other oriented state by applying a voltage.

In one example, the first and second oriented states may be each selected from a horizontal orientation, vertical orientation, twisted nematic orientation, or cholesteric orientation state. For example, in the black mode, the liquid crystal element or the liquid crystal layer may be at least in horizontal orientation, twisted nematic orientation or cholesteric orientation, and in the transparent mode, the liquid crystal element or liquid crystal layer may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as P-2000 from Jasco.

A method of realizing the liquid crystal element of the normally transparent or black mode by adjusting the dielectric constant anisotropy of the liquid crystal host, the alignment direction of the alignment film for orienting the liquid crystal host or the like is known.

The liquid crystal element may comprise two base films disposed opposite to each other and the active liquid crystal layer between the two base films.

In addition, the liquid crystal element may further comprise spacers for maintaining an interval of the two base films between the two base films and/or a sealant for attaching the base films in a state where the interval of two base films disposed opposite to each other is maintained. As the spacer and/or the sealant, a known material can be used without any particular limitation.

As the base film, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the base film, if necessary.

As the base film, a film having a phase difference in a predetermined range may be used. In one example, the base film may have an in-plane phase difference of 100 nm or less. In another example, the in-plane phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 5 nm or less, about 4 nm or less, about 3 nm or less, or about 2 nm or less, about 1 nm or less, or about 0.5 nm or less. In another example, the in-plane phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the base film may be, for example, 200 nm or less.

The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or 0.5 nm or less, and may be 0 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

In this specification, the in-plane phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences is about 550 nm.

In-plane phase difference$(Rin) = d \times (nx - ny)$  [Equation 1]

Thickness direction phase difference$(Rth) = d \times (nz - ny)$  [Equation 2]

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel.

The angle formed by the slow axis of the base film and a light absorption axis of a polarizer to be described below may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize optically excellent and uniform transparent and black modes through the phase difference adjustment or the arrangement of the slow axes.

The base film may have a coefficient of thermal expansion of 100 ppm/K or less. In another example, the coefficient of thermal expansion may be 95 ppm/K or less, 90 ppm/K or less, 85 ppm/K or less, 80 ppm/K or less, 75 ppm/K or less, 70 ppm/K or less, or 65 ppm/K or less, or may be 10 ppm/K or more, 20 ppm/K or more, 30 ppm/K or more, 40 ppm/K or more, 50 ppm/K or more, or 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of 90% or more may be used. The elongation at break may be 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or 175% or more, and may be 1,000% or less, 900% or less, 800% or less, 700% or less, 600% or less, 500% or less, 400% or less, 300% or less, or 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length).

By selecting the base film to have such a coefficient of thermal expansion and/or elongation at break, an optical device having excellent durability can be provided.

The thickness of the base film as above is not particularly limited, and for example, may be in a range of about 50 μm to 200 μm or so.

Among physical properties mentioned herein, when the measuring temperature or pressure influences the result, the corresponding physical property is measured at normal temperature and normal pressure, unless otherwise specified.

The term normal temperature is a natural temperature without warming or cooling, which may be generally any one temperature in a range of about 10° C. to 30° C., for example, a temperature of about 23° C. or about 25° C. or so. Unless otherwise specified, the unit of temperature in this specification is ° C.

The term normal pressure is a natural pressure without lowering or elevating, which generally means a pressure of about one atmosphere, such as atmospheric pressure.

In the liquid crystal element, a conductive layer and/or an alignment film may be present on one side of the base film, for example, on the side facing the active liquid crystal layer.

The conductive layer present on the side of the base film is a constitution for applying a voltage to the active liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the liquid crystal element in this field can be used.

In one example, an alignment film exists on the side of the base film. For example, a conductive layer may first be formed on one side of the base film, and an alignment film may be formed on its upper part.

The alignment film is a constitution for controlling orientation of the liquid crystal host included in the active liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base films disposed opposite to each other may form an angle in a range of about −10 degrees to 10 degrees, an angle in a range of −7 degrees to 7 degrees, an angle in a range of −5 degrees to 5 degrees or an angle in a range of −3 degrees to 3 degrees to each other, or may be approximately parallel to each other. In another example, the alignment directions of the two alignment layers may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or may be approximately perpendicular to each other.

Since the direction of the optical axis of the active liquid crystal layer is determined in accordance with such an alignment direction, the alignment direction can be confirmed by checking the direction of the optical axis of the active liquid crystal layer.

The shape of the liquid crystal element having such a structure is not particularly limited, which may be determined according to the application of the optical device, and is generally in the form of a film or a sheet.

In one example, the liquid crystal element may have a folded form. For example, at the time of observing a cross-section, the active liquid crystal element may have a cross-section comprising a first line whose curvature (=1/curvature radius) is in a range of 0 to 0.01; a folded area at the end of the first line and a second line connected to the folded area. That is, the active liquid crystal element may be included in the optical device in the folded form in the folded area. In another example, the curvature may be about 0.009 or less, 0.008 or less, 0.007 or less, 0.006 or less, 0.005 or less, 0.004 or less, 0.003 or less, 0.002 or less, 0.001 or less, 0.0009 or less, 0.0008 or less, 0.0007 or less, 0.0006 or less, 0.0005 or less, 0.0004 or less, 0.0003 or less, 0.0002 or less, 0.0001 or less, 0.00009 or less, 0.00008 or less, 0.00007 or less, 0.00006 or less, or 0.00005 or less.

As described below, the optical device of the present application may have a structure produced by placing the active liquid crystal element and/or a polarizer to be described below inside two outer substrates and vacuum-pressing them in a state where adhesive film are placed at the respective interfaces.

When such an optical device is exposed to high temperature, high humidity conditions, and the like, or in the process, defects such as wrinkles are formed on the liquid crystal element by the difference in coefficient of thermal expansion between the base film of the liquid crystal element and an adhesive film pressed thereto, and the like, such defects may affect adversely the performance of the optical device. In this regard, when the active liquid crystal device is implemented by the folded structure, it may be advantageous in solving the problem.

FIG. 1 is a diagram schematically showing a cross-section of the active liquid crystal element (10) having the folded structure. As in FIG. 1, the cross-section of the active liquid crystal element (10) may have a cross-section in the form in which a first line (101), a folded area (B) and a second line (102) are connected. Here, the first line (101) may be an active area, that is, an area serving to modulate light in order to substantially control a light transmission state. Such a first line (101) may be a planar shape, which has a curvature of 0, or may also be a curved shape, such as a convex shape or a concave shape.

As shown in FIG. 1, the liquid crystal element (10) has a folded structure based on the folded area (A), and thus a second line (102) is formed. At this time, the degree to which the second line (102) is folded is not particularly limited as long as it is controlled to such an extent that defects such as wrinkles of the liquid crystal element (10) do not occur in the optical device. In one example, the degree of folding may be set such that the angle formed by the first line (101) or the tangent (T) of the first line (101) and the second line (102) is, in a clockwise or counterclockwise direction, more than 0 degrees, 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, or 60 degrees or more or so. In another example, the angle may be 180 degrees or less, 170 degrees or less, 160 degrees or less, 150 degrees or less, 140 degrees or less, 130 degrees or less, or 120 degrees or less or so. Here, the tangent at which the angle with the second line (102) is measured is a tangent at the point (D) which divides the first line (101) approximately by two. Also, the second line for measuring the angle for the tangent (T) may be a line (1022) connecting the folded area (A) to the point where the second line (102) is terminated, as shown in FIG. 1.

In the form, the ratio (L1/L2) of the length (L1) of the first line (101) to the length (L2) of the second line (102) may be in a range of about 500 to 4,000. In another example, the ratio (L1/L2) may be about 550 or more, about 600 or more, about 650 or more, about 700 or more, about 800 or more, about 900 or more, about 1000 or more, about 1100 or more, about 1200 or more, about 1500 or more, 2000 or more, 2500 or more, 3000 or more, or 3500 or more, and may be 3500 or less, 3000 or less, 2900 or less, 2800 or less, 2700 or less, 2600 or less, 2500 or less, 2400 or less, 2300 or less, 2200 or less, 2100 or less, 2000 or less, about 1,900 or less, about 1,800 or less, about 1,700 or less, about 1,600 or less, about 1,500 or less, about 1,400 or less, about 1,300 or less, about 1,200 or less, about 1,100 or less, about 1,000 or less, about 900 or less, or about 800 or less.

In the relationship, the absolute lengths of the first line (101) and the second line (102) are not particularly limited, which may be determined according to the intended use of the optical device or the like. For example, the length of the first line (101) may be adjusted to be about 100 to 1,000 mm or so. In another example, the length of the first line (101) may be about 150 mm or more, about 200 mm or more, or about 250 mm or more. In another example, the length of the first line (101) may be about 900 mm or less, about 800 mm or less, about 700 mm or less, about 600 mm or less, or about 500 mm or less.

The folded structure may be formed at both ends in the cross-section of the liquid crystal element. Accordingly, as in FIG. 1, the folded areas (A) and the second lines (102) may be formed at both ends of the first line (101) in the cross-section of the active liquid crystal element.

In the structure, the second line may be further folded, and for example, as shown in FIG. 2, a second folded area (AA) exists on the second line (102), where the cross-section in the form that the second line (102) is further folded in the folded area (AA) may be realized.

The forming position of the additionally formed folded area (AA) is not particularly limited, and for example, the position may be adjusted so that the distance from the folded area (A) formed at the connecting portion of the first line (101) and the second line (102) to the folded area (AA) formed on the second line (102) becomes L2 satisfying the above-mentioned ratio (L1/L2).

The cross-section of the liquid crystal element in which the cross-section is observed is a cross-section observed when the liquid crystal element has been observed from any side. That is, the cross-section is preferably observed on any one side of the sides of the liquid crystal element.

In one embodiment, the cross-section in which the folded structure is observed may be a cross-section on a normal plane formed by including the long axis or the short axis of the liquid crystal element. Here, for example, in the case where the liquid crystal element (10) is observed from above, when it is the rectangular shape as in FIG. 3, the long axis may be the long side (LA) of horizontal and vertical lengths, and the short axis may be the short side (SA).

For example, the cross-sectional structure may be realized by folding a portion indicated by a dotted line in the liquid crystal element (10) having the same structure as FIG. 3.

When the liquid crystal element has a square shape, any one of the horizontal axis and the vertical axis may be regarded as the long axis and the other may be regarded as the short axis. Furthermore, in the case of a shape other than a rectangular shape, for example, in the case of an elliptical, circular or amorphous shape, and the like, when the liquid crystal element is observed from above, a line perpendicular to the line formed by the folded portion (for example, a dotted line in FIG. 3) may be any one of the short axis and the long axis, and a line which is again perpendicular to the line may be the other of the short axis and the long axis.

In one embodiment, as shown in FIG. 3, all four sides of the liquid crystal element can be folded to form the cross-section, and in this case, the cross-section may be observed on both the normal plane including the long axis of the liquid crystal element and the normal plane including the short axis.

Although the position of the above-mentioned sealant in the liquid crystal element having the folded structure is not particularly limited, generally, the sealant attaching the two base films may exist in the folded area (A in FIGS. 1 and 2) or an area facing from the folded area (A in FIGS. 1 and 2) toward the first line (101).

The optical device may comprise only the active liquid crystal element, or may further comprise a polarizer together with the active liquid crystal element, or may comprise only the polarizer. In addition, at least one or more of the active liquid crystal element and/or the polarizer may each be included. As the polarizer, for example, an absorbing linear polarizer, that is, a polarizer having a light absorption axis formed in one direction and a light transmission axis formed approximately perpendicular thereto may be used.

Assuming that the blocking state is implemented in the first oriented state of the active liquid crystal layer, the polarizer may be disposed in the optical device such that the angle formed by an average optical axis (vector sum of optical axes) of the first oriented state and the light absorption axis of the polarizer is 80 degrees to 100 degrees or 85 degrees to 95 degrees, or it is approximately perpendicular, or may be disposed in the optical device such that it is 35 degrees to 55 degrees or 40 degrees to 50 degrees or approximately 45 degrees.

When the alignment direction of the alignment film is used as a reference, the alignment directions of the alignment films formed on each side of the two base films of the liquid crystal element disposed opposite to each other as described above may form, to each other, an angle in a range of about −10 degrees to 10 degrees, an angle in a range of −7 degrees to 7 degrees, an angle in a range of −5 degrees to 5 degrees or an angle in a range of −3 degrees to 3 degrees, or in the case of being approximately parallel to each other, the angle formed by the alignment direction of any one of the two alignment films and the light absorption axis of the polarizer may be 80 degrees to 100 degrees or 85 to 95 degrees, or may be approximately perpendicular.

In another embodiment, the alignment directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or in the case of being approximately vertical to each other, the angle formed by the alignment direction of the alignment film disposed closer to the polarizer of the two alignment films and the light absorption axis of the polarizer may be 80 degrees to 100 degrees or 85 degrees to 95 degrees, or may be approximately perpendicular.

For example, as shown in FIG. 4, the liquid crystal element (10) and the polarizer (20) may be disposed in a state of being laminated on each other such that the optical axis (average optical axis) of the first alignment direction in the liquid crystal element (10) and the light absorption axis of the polarizer (20) become the above relationship.

In one embodiment, when the polarizer (20) is a polarizing coating layer to be described below, a structure in which the polarizing coating layer is present inside the liquid crystal element can be realized. For example, as shown in FIG. 5, a structure in which the polarizing coating layer (201) is present between any one base film (110) of the base films (110) of the liquid crystal element and the active liquid crystal layer (120) can be realized. For example, the conductive layer, the polarizing coating layer (201) and the alignment film as described above may be sequentially formed on the base film (110).

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the active liquid crystal element and the polarizer as described above. Thus, the optical device may comprise only one active liquid crystal element and may comprise only one polarizer.

The optical device may further comprise two outer substrates disposed opposite to each other. In this specification, one of the two outer substrates may be referred to as a first outer substrate and the other may be referred to as a second outer substrate for the sake of convenience, but the first and second representations do not define the order or vertical relationship of the outer substrates. In one embodiment, the active liquid crystal element and/or the polarizer may be encapsulated between the two outer substrates. Such encapsulation may be performed using an adhesive film. For example, as shown in FIG. 6, the active liquid crystal element (10) and/or the polarizer (20) may exist between the two substrates (30) disposed opposite to each other.

As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate) film; a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

As the outer substrate, a substrate having a phase difference in a predetermined range may be used. In one embodiment, the outer substrate may have an in-plane phase difference of 100 nm or less. In another embodiment, the in-plane phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, or about 2 nm or less, or about 1 nm or less. In another embodiment, the in-plane phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the outer substrate may be, for example, 200 nm or less. The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less, and may be 0 nm or more, 5 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

The in-plane phase difference (Rin) and the thickness direction phase difference (Rth) of the outer substrate may be calculated in the same manner, except that in Equations 1 and 2 above, the thickness (d), the refractive index in the slow axis direction (nx), the refractive index in the fast axis direction (ny) and the refractive index in the thickness direction (nz) are substituted with the thickness (d), the refractive index in the slow axis direction (nx), the refractive index in the fast axis direction (ny) and the refractive index in the thickness direction (nz), of the outer substrate, respectively, to calculate them.

When the outer substrate is optically anisotropic, the angle formed by the slow axes of the outer substrates disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel.

The angle formed by the slow axis of the outer substrate and, in the case where the above-described base film is optically anisotropic, the slow axis of the base film may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize optically excellent and uniform transparent and black modes through the phase difference adjustment or the arrangement of the slow axes.

As the outer substrate, a substrate having a coefficient of thermal expansion of 100 ppm/K or less may be used. In another embodiment, the coefficient of thermal expansion may be 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or 15 ppm/K or less, or may be 1 ppm/K or more, 2 ppm/K or more, 3 ppm/K or more, 4 ppm/K or more, 5 ppm/K or more, 6 ppm/K or more, 7 ppm/K or more, 8 ppm/K or more, 9 ppm/K or more, or 10 ppm/K or more.

The methods of measuring the coefficient of thermal expansion and the elongation at break of the outer substrate are the same as the methods of measuring the coefficient of thermal expansion and elongation at break of the base film as described above.

By selecting the outer substrate to have such a coefficient of thermal expansion and/or elongation at break, an optical device having excellent durability can be provided.

The thickness of the outer substrate as above is not particularly limited, and for example, may be about 0.3 mm or more. In another embodiment, the thickness may be about 0.5 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, or 3 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

Here, in the case of having the curved surface shape at the same time, the respective curvatures or curvature radii may be the same or different.

In this specification, the curvature or curvature radius may be measured in a manner known in the industry, and for example, may be measured using a contactless apparatus such as a 2D profile laser sensor, a chromatic confocal line sensor or a 3D measuring conforcal microscopy. The method of measuring the curvature or curvature radius using such an apparatus is known.

With respect to the substrate, for example, when the curvatures or the curvature radii at the front surface and the back surface are different from each other, the curvatures or curvature radii of the respective facing surfaces (that is, the curvature or curvature radius of the surface facing a second outer substrate in the case of a first outer substrate and the curvature or curvature radius of the surface facing the first outer substrate in the case of the second outer substrate) may be a reference. In another embodiment, when the curvatures or the curvature radii at the front surface and the back surface of the respective outer substrates are different from each other, the curvatures or curvature radii of the respective surfaces not facing (that is, the curvature or curvature radius of the surface opposite to the surface facing a second outer substrate in the case of a first outer substrate and the curvature or curvature radius of the surface opposite to the surface facing the first outer substrate in the case of the second outer substrate) may also be a reference. Furthermore, when the relevant surface has portions that the curvatures or curvature radii are not constant and different, the largest curvature or curvature radius, or the smallest curvature or curvature radius, or the average curvature or average curvature radius may be a reference.

Both of the substrates may have a difference in curvature or curvature radius within 10%, within 9%, within 8%, within 7%, within 6%, within 5%, within 4%, within 3%, within 2% or within 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the differences in curvatures or curvature radii of two outer substrates can be the same, the difference in curvature or curvature radius may be 0% or more, or more than 0%, 0.5% or more, 1% or more, 1.5% or more, 2% or more, or 2.5% or more.

The control of such a curvature or curvature radius is useful in a structure in which an active liquid crystal element and/or a polarizer are encapsulated by an adhesive film as in the optical device of the present application.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

FIG. 7 is a side illustration that an encapsulation portion (400) comprising an active liquid crystal element exists between first and second outer substrates (301, 302), where the center of the curvature in both the first and second outer substrates (301, 302) exists at the lower part in the drawing.

The specific range of each curvature or curvature radius of the first and second outer substrates is not particularly limited. In one embodiment, the curvature radius of each substrate may be 100R or more, 200R or more, 300R or more, 400R or more, 500R or more, 600R or more, 700R or more, 800R or more, or 900R or more, or may be 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or 1,050R or less. Here, R denotes a curved gradient of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one embodiment, when the curvatures of the first and second outer substrates are different from each other, the curvature radius of the substrate having a large curvature among them may be within the above range.

In one embodiment, when the curvatures of the first and second outer substrates are different from each other, a substrate having a large curvature among them (that is, a substrate having a small curvature radius) may be a substrate that is disposed in the gravity direction upon using the optical device.

That is, in one embodiment, when the curvatures of the first and second outer substrates are different from each other, the outer substrate existing at the upper part along the convex direction formed by the optical device may have a larger curvature radius (i.e., small curvature) as compared to the outer substrate existing at the lower part. Here, the convex direction formed by the optical device is a direction in which the convex shape formed by the two outer substrates included in the optical device or the curved substrate which is one of the outer substrates thereof faces, which may mean, for example, in the case of FIG. 7, the direction facing from the substrate 302 to the substrate 301. That is, in the illustration of FIG. 7, the substrate existing at the upper part along the convex direction is the substrate 301, and the substrate existing at the lower part is the substrate 302.

When it is designed so that the outer substrate (301 in the case of FIG. 7) existing at the upper part along the convex direction formed by the optical device has a larger curvature radius (that is, small curvature) as compared to the outer substrate existing at the lower part (302 in the case of FIG. 7) like so, the internal pressure can be generated in a direction where the two outer substrates are closer to each other at the central portion of the inside of the optical device by the restoring force of the two outer substrates and the adhesive force of the encapsulating agent (adhesive) bonding the two outer substrates. Accordingly, the structure in which the active liquid crystal element and/or the polarizer are encapsulated between the two outer substrates by the encapsulating agent can be more stably realized, and as a result, it is also possible to prevent the occurrence of factors adversely affecting optical properties, such as bubbles, inside.

As described above, the internal pressure generated in a specific direction at a specific position is also reflected in the thickness of the optical device. That is, in such a structure, the thickness (T1) of the optical device at the center of gravity may be thinner than the thickness (T2) at a rim by the internal pressure (T1<T2). In this case, the difference ($=100\times(T2-T1)/T1$) between the thickness (T1) at the center of gravity and the thickness (T2) at the rim may be more than about 0%, about 0.5% or more, about 1% or more, about 1.5% or more, about 2% or more, or about 2.5% or more, or may be about 10% or less, about 9% or less, about 8% or less, about 7% or less, about 6% or less, about 5% or less, about 4% or less, or about 3% or less or so. It is possible to provide an optical device with more excellent durability by generating an internal pressure so that the thickness relationship as above can be ensured.

Here, the center of gravity may mean a point where the optical device is horizontally balanced when it is suspended or supported, as is known, and the rim may be the end portion of the optical device or a portion adjacent to the end portion.

For the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal element and/or polarizer, and bubbles may be formed inside.

However, when the curvatures or curvature radii between the substrates, the thickness and the layout of the outer substrates are controlled as described above, the net force which is the sum of the restoring force and the gravity may act, in particular, in the center area of gravity to prevent the widening and also to withstand the same process pressure as the autoclave, even if the adhesion force by the adhesive film is lowered.

The optical device may further comprise an adhesive film encapsulating the active liquid crystal element and/or the polarizer in the outer substrates. For example, as shown in FIG. 8, the adhesive film (40) may be present between the outer substrate (30) and the active liquid crystal layer (10), between the active liquid crystal layer (10) and the polarizer (20) and/or between the polarizer (20) and the outer substrate (30), and may be present on the sides of the active liquid crystal layer (10) and the polarizer (20), appropriately, on all sides.

The adhesive film may encapsulate the active liquid crystal layer (10) and the polarizer (20) while attaching the outer substrate (30) and the active liquid crystal layer (10), the active liquid crystal layer (10) and the polarizer (20), and the polarizer (20) and the outer substrate (30) to each other.

For example, after laminating outer substrates, an active liquid crystal element, a polarizer and an adhesive film according to a desired structure, the above structure can be realized by a method of pressing them in a vacuum state.

As the adhesive film, a known material can be used without any particular limitation, and for example, among a known thermoplastic polyurethane adhesive film (TPU: thermoplastic polyurethane), TPS (thermoplastic starch), polyamide adhesive film, polyester adhesive film, EVA (ethylene vinyl acetate) adhesive film, polyolefin adhesive film such as polyethylene or polypropylene, or polyolefin elastomer film (POE film), and the like, one satisfying physical properties to be described below can be selected.

As the adhesive film, a film having a phase difference in a predetermined range may be used. In one embodiment, the adhesive film may have an in-plane phase difference of 100 nm or less. In another embodiment, the in-plane phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less. The in-plane phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of the thickness direction phase difference of the adhesive film may be, for example, 200 nm or less. In another embodiment, the absolute value may be about 190 nm or less, 180 nm or less, 170 nm or less, 160 nm or less, 150 nm or less, 140 nm or less, 130 nm or less, 120 nm or less, or 115 nm or less, or may be 0 nm or more, 10 nm or more, 20 nm or more, 30 nm or more, 40 nm or more, 50 nm or more, 60 nm or more, 70 nm or more, 80 nm or more, or 90 nm or more. As long as the thickness direction phase difference has an absolute value in the above range, it may be negative, or may be positive.

The in-plane phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz) are substituted with the thickness (d), the refractive index in the slow axis direction (nx), the refractive index in the fast axis direction (ny) and the refractive index in the thickness direction (nz), of the adhesive film, respectively, to calculate them.

Here, the thickness of the adhesive film may be a thickness of the adhesive film between the outer substrate (30) and the active liquid crystal layer (10), such as an interval between the two, a thickness of the adhesive film between the active liquid crystal layer (10) and the polarizer (20), such as an interval between the two, and a thickness of the adhesive film between the polarizer (20) and the outer substrate (30), such as an interval between the two.

As the adhesive film, one having a Young's modulus in a range of 0.1 to 100 MPa may be used. The Young's modulus may be measured in accordance with ASTM D882 standard, and may be measured by tailoring the film in the form provided by the corresponding standard and using equipment capable of measuring stress-strain curve (capable of simultaneously measuring force and length).

By selecting the adhesive film to have such a Young's modulus, an optical device with excellent durability can be provided.

The thickness of such an adhesive film is not particularly limited, which may be, for example, in a range of about 200 μm to 600 μm. Here, the thickness of the adhesive film may be a thickness of the adhesive film between the outer substrate (30) and the active liquid crystal layer (10), such as an interval between the two, a thickness of the adhesive film between the active liquid crystal layer (10) and the polarizer (20), such as an interval between the two, and a thickness of the adhesive film between the polarizer (20) and the outer substrate (30), such as an interval between the two.

The optical device may further comprise a buffer layer. Such a buffer layer may be present on one side or both sides of the liquid crystal element. FIG. 9 shows a structure in which the buffer layer (50) is present on both sides of the active liquid crystal element (10), but the buffer layer (50) may also be present only on one side of the liquid crystal element (10).

The buffer layer can mitigate the negative pressure caused by the difference in the coefficient of thermal expansion between layers in a structure in which the active liquid crystal element is encapsulated by an adhesive film, and enable so that a more durable device can be realized.

In one embodiment, as the buffer layer, a layer having a Young's modulus of 1 MPa or less may be used. In another embodiment, the Young's modulus of the buffer layer may be 0.9 MPa or less, 0.8 MPa or less, 0.7 MPa or less, 0.6 MPa or less, 0.6 MPa or less, 0.1 MPa or less, 0.09 MPa or less, 0.08 MPa or less, 0.07 MPa or less, or 0.06 MPa or less. In another embodiment, the Young's modulus is about 0.001 MPa or more, 0.002 MPa or more, 0.003 MPa or more, 0.004 MPa or more, 0.005 MPa or more, 0.006 MPa or more, 0.007 MPa or more, 0.008 MPa or more, 0.009 MPa or more, 0.01 MPa or more, 0.02 MPa or more, 0.03 MPa or more, 0.04 MPa or more, or 0.045 MPa or more. Here, the measurement method of the Young's modulus is the same as the above-mentioned measuring method of the adhesive film.

As the buffer layer, a transparent material showing the above-mentioned Young's modulus may be used without particular limitation, and for example, an acrylate-based, urethane-based, rubber-based or silicon-based oligomer or polymer material, and the like can be used.

The thickness of the buffer layer is not particularly limited, which may be selected within a range that can effectively reduce the negative pressure generated inside the device by exhibiting the Young's modulus in the above range.

The optical device may further comprise any necessary configuration other than the above configurations, and for example, comprise a known configuration such as a retardation layer, an optical compensation layer, an antireflection layer and a hard coating layer in a proper position.

The method of manufacturing the optical device of the present application is not particularly limited. In one embodiment, the optical device can be manufactured via an autoclave process for the above-described encapsulation.

For example, the manufacturing method of the optical device may comprise a step of encapsulating the active liquid crystal element and/or the polarizer between the first and second outer substrates disposed opposite to each other through an autoclave process using an adhesive film. In this process, the details including the difference in curvature of the first and second outer substrates and the like are as described above.

The autoclave process can be performed by arranging the adhesive film, the active liquid crystal device and/or the polarizer between the outer substrates according to the desired encapsulation structure, and heating/pressing them.

For example, an optical device as shown in FIG. 8 can be formed by heating/pressing a laminate in which an outer substrate (30), an adhesive film (40), an active liquid crystal layer (10), an adhesive film (40), a polarizer (20), an adhesive film (40) and an outer substrate (30) are arranged in this order and an adhesive film (40) is also disposed on the sides of the active liquid crystal layer (10) and the polarizer (20) in an autoclave process.

The conditions of the autoclave process are not particularly limited, and for example, the process can be performed under appropriate temperature and pressure depending on the kind of the applied adhesive film. The temperature of a typical autoclave process is about 80° C. or more, 90° C. or more, or 100° C. or more, and the pressure is 2 atm or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one embodiment, the optical device itself may be a sunroof for a vehicle.

For example, in an automobile including a body in which at least one opening is formed, the optical device or the sunroof for a vehicle attached to the opening can be mounted and used.

At this time, when the curvatures or curvature radii of the outer substrates are different from each other, a substrate having a smaller curvature radius, that is, a substrate having a larger curvature, can be arranged in the gravity direction.

Advantageous Effects

The present application provides an optical device capable of varying transmittance, and such an optical device can be used for various applications such as eyewear, for example, sunglasses or AR (augmented reality) or VR (virtual reality) eyewear, an outer wall of a building or a sunroof for a vehicle.

BRIEF DESCRIPTION OF DRAWINGS

Figure 5:
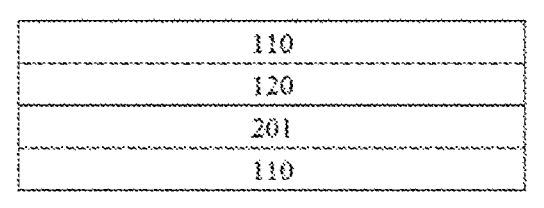

FIGS. 4 to 9 are illustrative drawings for explaining an optical device of the present application.

DETAILED DESCRIPTION

Hereinafter, the scope of the present application will be described in more detail through Examples and Comparative Examples, but the scope of the present application is not limited by the following examples.

1. Measurement of Curvature Radius

A curvature radius of curvature of an outer substrate was measured using a 2D profile laser sensor. Also, in the following, the curvature radii of the respective outer substrates were curvature radii of the surfaces facing each other, and when the curvature radii were not constant and there were different portions, the largest curvature radius was used as a reference.

2. Measurement of Thickness

Figure 11:
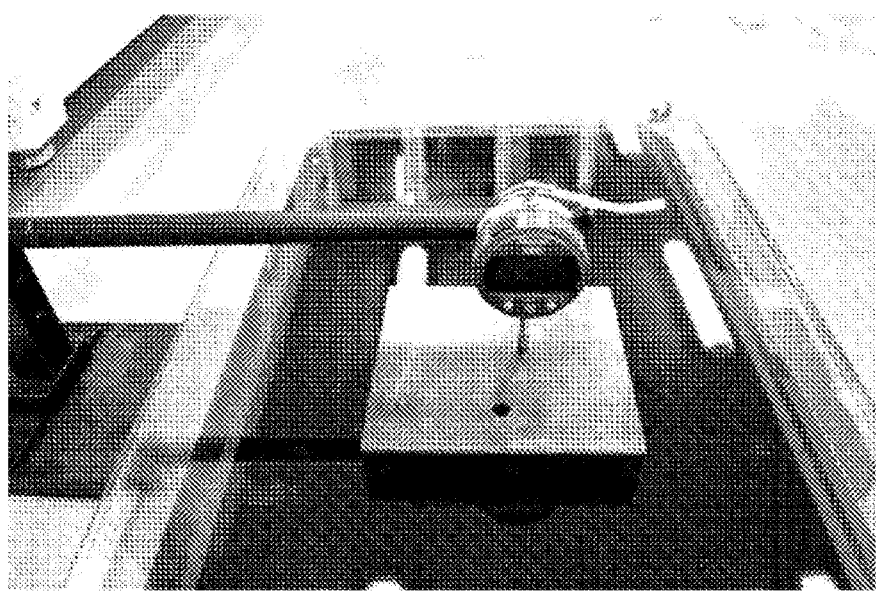
FIGS. 11 to 13 are photographs related to thickness measurement of an optical device.
Figure 12:
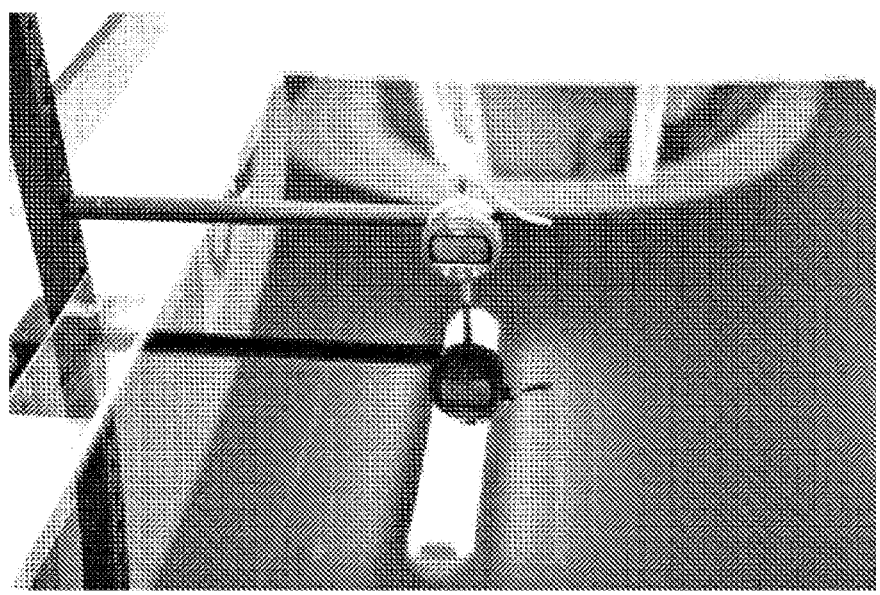
Figure 13:
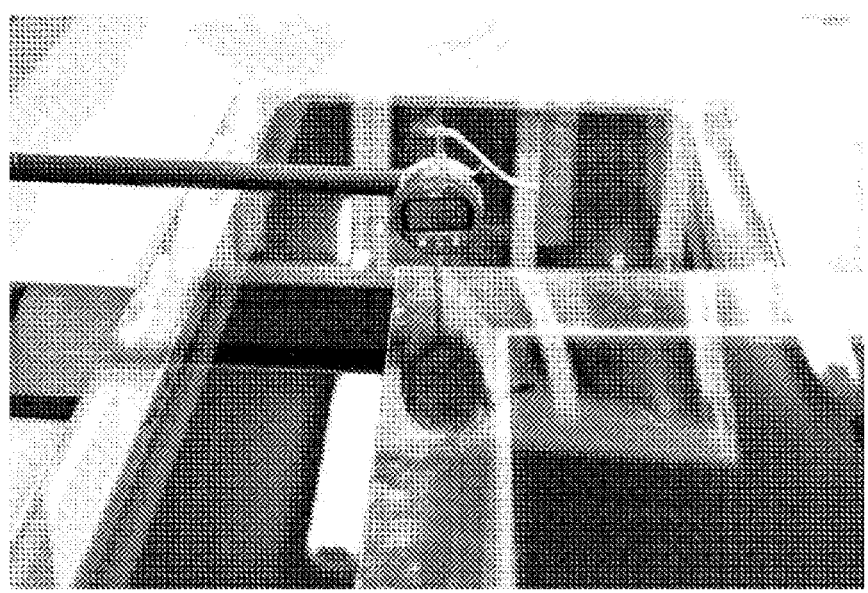

Thicknesses of the center of gravity and the rim in an optical device were measured using an instrument that a thickness measuring instrument (Mitutoyo, thickness gage 12/0.001 mm 547-401, resolution: 1 μm, accuracy: ±3 μm, range: 0 to 12 mm) was reassembled on a stand as shown in FIG. 11. The zero point of the measuring instrument was first set as in FIG. 11, the thickness was measured as in FIGS. 12 and 13, and then the thickness was determined by confirming whether or not the zero point was correct again.

Example 1

Figure 1:
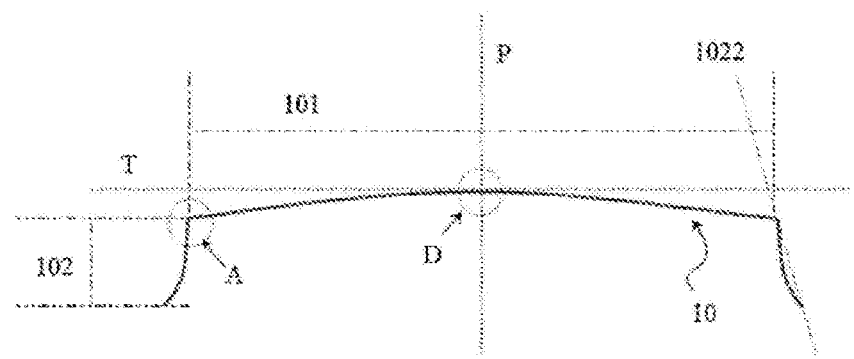
FIGS. 1 to 3 are drawings for explaining a folded structure of a liquid crystal element of the present application.
Figure 2:
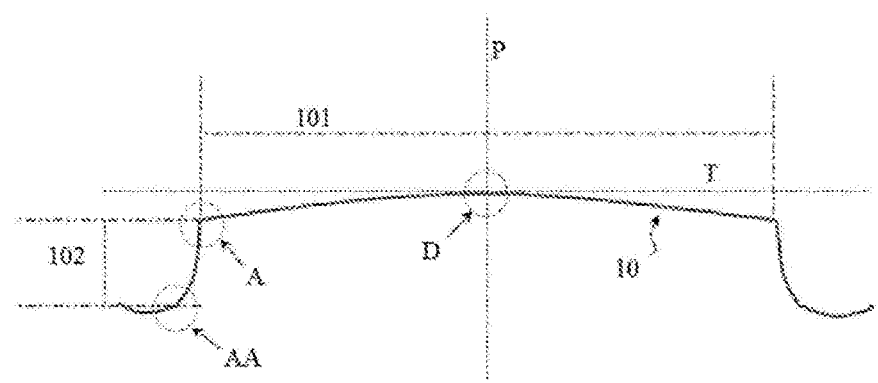
Figure 3:
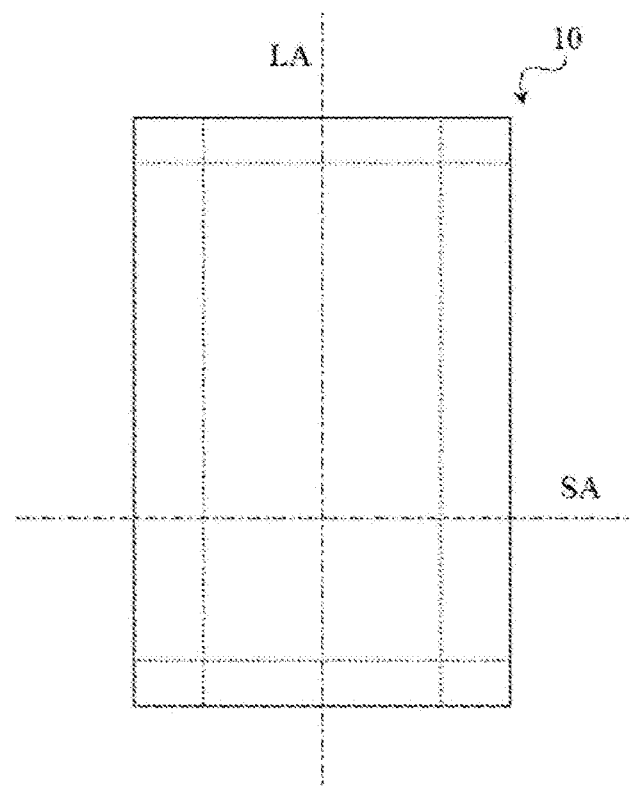
Figure 4:
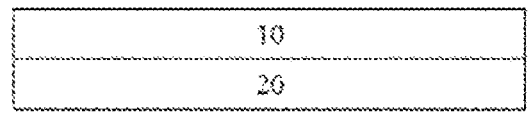
Figure 6:
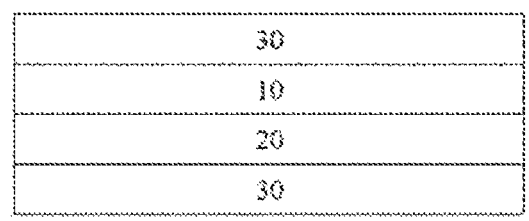
Figure 7:
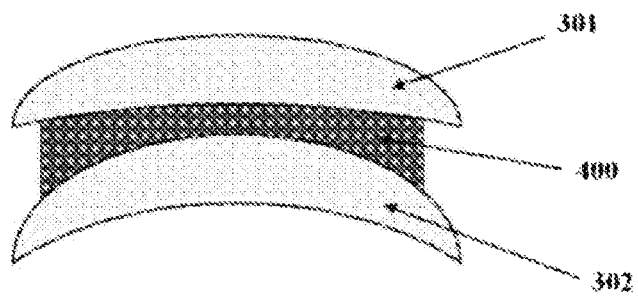
Figure 8:
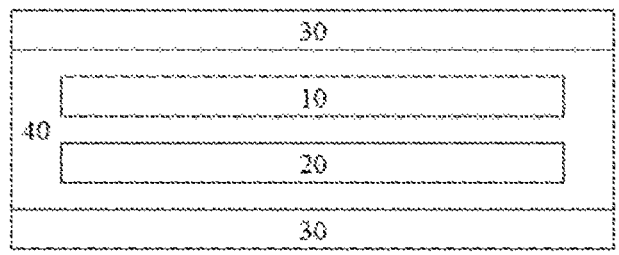
Figure 9:
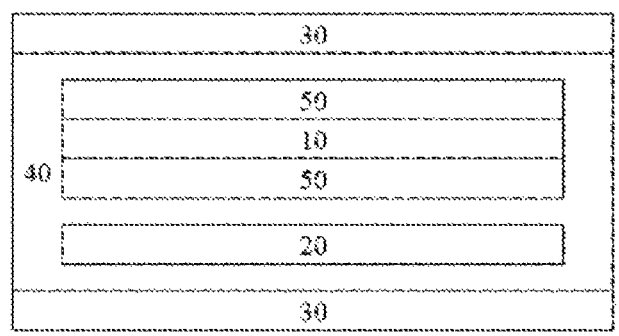

An optical device was produced by encapsulating a guest-host liquid crystal device (cell gap: about 12 μm, base film type: PET (poly(ethylene terephthalate) film), liquid crystal/dye mixture type: mixture of MAT-16-969 liquid crystals from Merck and an anisotropic dye (BASF, X12)) as an active liquid crystal element and a PVA (polyvinyl alcohol)-based polarizer between two outer substrates with thermoplastic polyurethane adhesive films (thickness: about 0.38 mm, manufacturer: Argotec Co., Ltd., product name: Argo-Flex). Here, as the outer substrates, glass substrates having a thickness of about 3 mm or so were used, where a substrate having a curvature radius of about 1030R (first outer substrate) and a substrate having a curvature radius of 1000R (second outer substrate) were used. The difference between the curvature radii of the first and second outer substrates is approximately 3%. A laminate was produced by laminating the first outer substrate, the adhesive film, the active liquid crystal element, the adhesive film, the polarizer, the adhesive film and the second outer substrate in this order, and disposing the adhesive film on all sides of the active liquid crystal element as well. Referring to FIG. 7, the structure of the laminate was in the form of the first outer substrate (curvature radius 1030R, 301), the adhesive film, the active liquid crystal element, the adhesive film, the polarizer, the adhesive film and the second outer substrate (curvature radius 1000R, 302), where the second outer substrate (302) was arranged in the gravity direction as compared to the first outer substrate (301). Thereafter, the optical device was produced by performing an autoclave process at a temperature of about 100° C. and a pressure of about 2 atm or so.

Figure 10:
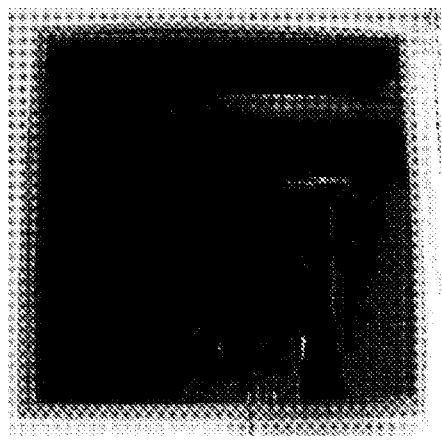
FIG. 10 is a photograph showing the result of an example.

The thickness at the center of gravity was about 7.82 mm and the thickness at the rim was about 8.03 mm, as measured for the manufactured optical device. Thus, the thickness difference is approximately 2.69% or so. The produced optical device was then applied to a high temperature long term durability test (holding at a temperature of 100° C. for about 168 hours). FIG. 10 is a photograph of the device after the durability test. From the drawing, it can be confirmed that the optical device has been produced stably without occurrence of bubbles or widening of the substrate.

EXPLANATION OF REFERENCE NUMERALS AND SYMBOLS

- 10: active liquid crystal element
- 101: first line
- 102: second line
- A, AA: folded area
- D: bisector of the first line
- T: Tangent of the bisector of the first line
- P: normal to the tangent of the bisector of the first line
- 1022: line for measuring the angle of the second line
- 20: polarizer
- 201: polarizing coating layer
- 30: outer substrate
- 40: adhesive film
- 50: buffer layer
- 110: base film
- 120: active liquid crystal layer

The invention claimed is:

1. An optical device, comprising:
   first and second outer substrates disposed to face each other; and
   an active liquid crystal element encapsulated between the first and second outer substrates,
   wherein at least one of the first or second outer substrates is a curved substrate, wherein the active liquid crystal element comprises two base films disposed opposite to each other and an active liquid crystal layer between the two base films,
   wherein the active liquid crystal element is encapsulated with an adhesive film, wherein the adhesive film is disposed at least between the active liquid crystal element and the first or the second outer substrate,
   wherein a thickness at a center of gravity of the optical device is thinner than a thickness of a rim of the optical device at its rim,
   wherein the first outer substrate and the second outer substrate are bent in the same direction at the rim,
   wherein a thickness of each of the first and second outer substrates is 1 mm or more and a curvature radius of each of the first and second outer substrates is 2,000R or less.

2. The optical device according to claim 1, wherein the first and second outer substrates are both curved substrates.

3. The optical device according to claim 2, wherein curvature centers of the first and second outer substrates are present in the same portion of an upper part or a lower part of the first and second outer substrates.

4. The optical device according to claim 1, wherein a difference between curvature radii of the first and second outer substrates is within 10%.

5. The optical device according to claim 1, wherein curvatures of the first and second outer substrates are different from each other.

6. The optical device according to claim 1, wherein the curvature radius is from 100R to 2,000R.

7. The optical device according to claim 1, wherein, among the first and the second outer substrates, one of outer substrates that exists at an upper position in a direction along a convex direction formed by the curved substrate has a larger curvature radius than the other outer substrate that exists at a lower position in a direction along the convex direction formed by the curved substrate.

8. The optical device according to claim 1, wherein the first or the second outer substrate is a glass substrate.

9. The optical device according to claim 1, wherein a thickness difference between the thickness at the center of gravity and the thickness at the rim is 0.5% or more.

10. The optical device according to claim 1, further comprising a polarizer encapsulated between the first and second outer substrates.

11. The liquid crystal display device according to claim 10, wherein the active liquid crystal element and the polarizer are encapsulated with the adhesive film existing between the outer substrate and the active liquid crystal element, between the active liquid crystal element and the polarizer, between the polarizer and the outer substrate, and on sides of the active liquid crystal element and the polarizer.

12. A method of manufacturing the optical device of claim 1 comprising:
   encapsulating the active liquid crystal element between the first and second outer substrates disposed opposite to each other through an autoclave process using the adhesive film,
   wherein both of the first or second outer substrates are curved substrates,
      wherein the active liquid crystal element comprises the two base films disposed opposite to each other and the active liquid crystal layer is between the two base films, and
   wherein the adhesive film is disposed at least between the active liquid crystal element and the first or the second outer substrates, wherein the first and second outer substrates are disposed such that their curvature centers are present in the same portion among an upper part or a lower part of the first and second outer substrates,
   wherein the first and second outer substrates are disposed such that the first outer substrate disposed at an upper position in a direction along a convex direction formed by the curved substrates has a larger curvature radius than the second outer substrate at a lower position in a direction along the convex direction formed by the curved substrate,
      wherein a difference in curvatures or curvature radii of the first and the second outer substrate is from 1.5% to 10%
      wherein a thickness of each of the first and second outer substrates is 1 mm or more and a curvature radius of each of the first and second outer substrates is 2,000R or less.

13. An automobile comprising a body on which one or more openings are formed; and the optical device of claim 1 attached to the openings.

14. An optical device, comprising:
   first and second outer substrates disposed to face each other; and an active liquid crystal element encapsulated between the first and second outer substrates, wherein at least one of the first and second outer substrates is a curved substrate, wherein the active liquid crystal element comprises two base films disposed opposite to each other and an active liquid crystal layer between the two base films, wherein the active liquid crystal element is encapsulated with an adhesive film, wherein the adhesive film is at least between the active liquid crystal element and the first or the second outer substrate, wherein a thickness of the optical device at its center of gravity is thinner than a thickness of the optical device at its rim, wherein the first and second outer substrates are bent in the same direction at the rim, and wherein a thickness of each of the first and second outer substrates is 2 mm or more and a curvature radius of each of the first and second outer substrates is 3,000R or less.

* * * * *